(12) United States Patent
Schuessler

(10) Patent No.: US 6,613,466 B1
(45) Date of Patent: Sep. 2, 2003

(54) FUEL CELL SYSTEM AND METHOD FOR OPERATING THE PROCESS

(75) Inventor: Martin Schuessler, Ulm (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/658,994

(22) Filed: Sep. 11, 2000

(30) Foreign Application Priority Data

Sep. 10, 1999 (DE) .......................................... 199 43 248

(51) Int. Cl.⁷ .............................. H01M 8/04; H01M 8/12
(52) U.S. Cl. ............................... 429/17; 429/24; 429/25
(58) Field of Search ............................. 429/47, 13, 19, 429/24, 25, 26, 39

(56) References Cited

U.S. PATENT DOCUMENTS

| | | | | |
|---|---|---|---|---|
| 5,981,096 A | * | 11/1999 | Hornburg et al. ............. | 429/17 |
| 6,120,923 A | * | 9/2000 | Van Dine et al. ............. | 429/17 |
| 6,165,633 A | * | 12/2000 | Negishi ...................... | 423/651 |
| 6,171,718 B1 | * | 1/2001 | Murach et al. ............... | 425/25 |
| 6,241,792 B1 | * | 6/2001 | Schuessler et al. ......... | 422/187 |
| 6,277,508 B1 | * | 8/2001 | Reiser et al. ............... | 422/182 |

* cited by examiner

*Primary Examiner*—Randy Gulakowski
*Assistant Examiner*—Donald V. Scaltrito

(57) ABSTRACT

In a process for operating a fuel cell system with a water balance, a hydrogen-containing medium or a mixture of mediums is reformed in a reforming reactor with a water requirement, by adding water to a hydrogen rich reformate. The reformate is fed to an anode region of a fuel cell and reacts with oxygen from a cathode region of the fuel cell, forming water in the fuel cell. The the water required for the reforming reaction and/or the water balance of the fuel cell system is coupled directly to the oxidation rate of the partial combustion of the hydrogen-containing medium or the mixture of mediums in an oxidizing unit upstream of the reforming reactor.

26 Claims, 1 Drawing Sheet

FUEL CELL SYSTEM AND METHOD FOR OPERATING THE PROCESS

BACKGROUND AND SUMMARY OF THE INVENTION

This application claims the priority of German patent document 199 43 248, filed Sep. 10, 1999, the disclosure of which is expressly incorporated by reference herein.

The invention relates to a fuel cell system and a process for operating a fuel cell system.

Fuel cell systems can be used, for example, in fuel cell operated motor vehicles. A suitable liquid or gaseous fuel mixture, (e.g., a hydrogen rich gas mixture or a liquid mixture of water and methane) is fed into the anode region of the fuel cell where it is reacted, and the reacted mixture is then discharged via the anode output. Correspondingly, an oxygen-containing gas (air, for example) is fed into the cathode region, where the oxygen is reduced, thus forming water, and the water-containing cathode waste gas is exhausted via the cathode output.

In many applications it is desirable to separate the water contained in the cathode waste gas from the other components (e.g., in order to reutilize the water and/or the cathode waste gas, cleaned of the contained water). For this purpose there are water separators arranged in the cathode output. Usually they comprise a condenser, in which the water is removed by condensation at a suitably low temperature. This feature requires a substantial buildup of heat transfer for the condenser in order to adequately cool the cathode waste gas.

Often the cathode output also includes an expander in the form of a turbine that is coupled to a cathode input side compressor. In this case a condenser can be arranged upstream and/or downstream of the expander. Such a fuel cell system is described, e.g. in German patent document DE 197 01 560 A1.

The earlier German patent document DE 199 11 016 describes how to recover the water from cathode waste gas by means of a diaphragm. In this case, the temperature for separating the water does not have to be lowered substantially, but an adequately high pressure gradient from the mixture chamber, defining the one diaphragm side, to the water collecting chamber, defining the other diaphragm side, is required to achieve a satisfactory selective water separation from the residual cathode waste gas.

In a fuel cell system with low system pressure the problem of water separation becomes even more critical, since at low system pressure there is, on the one hand, no adequately high pressure differential for the diaphragm process, and, on the other hand, the requirements imposed on the temperature drop for water separation using a condenser, as compared to a high pressure system, increase. Thus, a suitable heat transfer buildup must be correspondingly even higher.

One object of the invention is to provide an improved process and apparatus for recovery in a fuel cell system at low pressure.

This and other objects and advantages are achieved by the fuel cell system and method according to the invention, in which the fuel cell is operated with a water balance, using a hydrogen-containing medium as the operating medium. The water requirement of a reforming reaction and/or the water balance of the fuel cell system is coupled directly to the oxidation rate of the partial combustion of the hydrogen-containing medium (or the mixture of mediums) in an oxidizing unit upstream of the reforming reactor.

At the same time, when the reforming reaction requires additional water, it is advantageous to increase the rate of oxidation, and to decrease it for a reduced water requirement.

Preferably the reforming reaction is supported directly with thermal energy generated during combustion. In particular it is preferred that the reforming reaction be supported thermally using only the thermal energy generated during combustion.

In a preferred embodiment of the invention, an evaporating reaction in a first evaporator is supported with the thermal energy generated during combustion.

In another preferred embodiment thermal energy from the waste gases of the fuel cell is provided for evaporating the hydrogen-containing medium or mix of mediums in a second evaporator so that the hydrogen-containing medium or the mixture of mediums is fed at least in part in a gaseous state to the first evaporator. If the reforming reaction requires additional water, it is advantageous to bypass the second evaporator.

In another preferred embodiment of the invention, carbon monoxide is removed from the reformate in an exothermic reaction, which is cooled independently of the thermal requirement of the reforming reaction.

In another preferred embodiment, thermal energy is also removed from a thermal system, comprised of a first evaporator, an oxidizing unit and a reforming unit or comprised of an oxidizing unit and a reforming unit, in order to increase the rate of oxidation.

It is advantageous to feed oxygen into the oxidizing unit as a function of the temperature in an area of combustion and/or in the area of the reforming reaction.

Another advantageous measure is to feed oxygen into the oxidizing unit as a function of the outlet temperature of the medium from the oxidizing unit and/or the outlet temperature of the reformate from the reforming reaction.

The apparatus for carrying out the process according to the invention comprises a fuel cell system, wherein an anode input includes an oxidizing unit for oxidizing a hydrogen-containing medium or a mixture of mediums and a reforming unit for generating a hydrogen rich reformate from the hydrogen-containing medium or mixture of mediums. The oxidizing unit is thermally coupled directly to the reforming unit.

It is also an advantageous embodiment to provide in the component a first evaporator for evaporating the hydrogen-containing medium (or mixture), with the evaporator being thermally coupled directly to the oxidizing unit.

In a preferred embodiment a second evaporator, which can be heated with the waste gases of the fuel cell, is arranged with respect to the hydrogen-containing medium or a mixture of mediums on the inflow side in front of the component.

It is advantageous to arrange a carbon monoxide removing unit between the component and the anode region, to remove carbon monoxide from the reformate. It is especially preferred that the carbon monoxide removing unit be coolable independently of the reforming unit.

The invention is especially appropriate for fuel cell systems with low system pressure, in particular for fuel cell systems in which at least the cathode output exhibits a medium pressure of a maximum of 2 bar. Such a low pressure level can be achieved with simple blowers, so that the cost of expensive compressors and other high pressure components can be saved. The system according to the invention is simple, and is especially advantageous for applications where the consumers are to be supplied with low to average electrical power using fuel cells.

It is particularly useful for auxiliary units in motor vehicles or stationary systems.

Other objects, advantages and novel features of the present invention will become apparent from the following detailed description of the invention when considered in conjunction with the accompanying drawings.

DETAILED DESCRIPTION OF THE DRAWINGS

Figure 1:
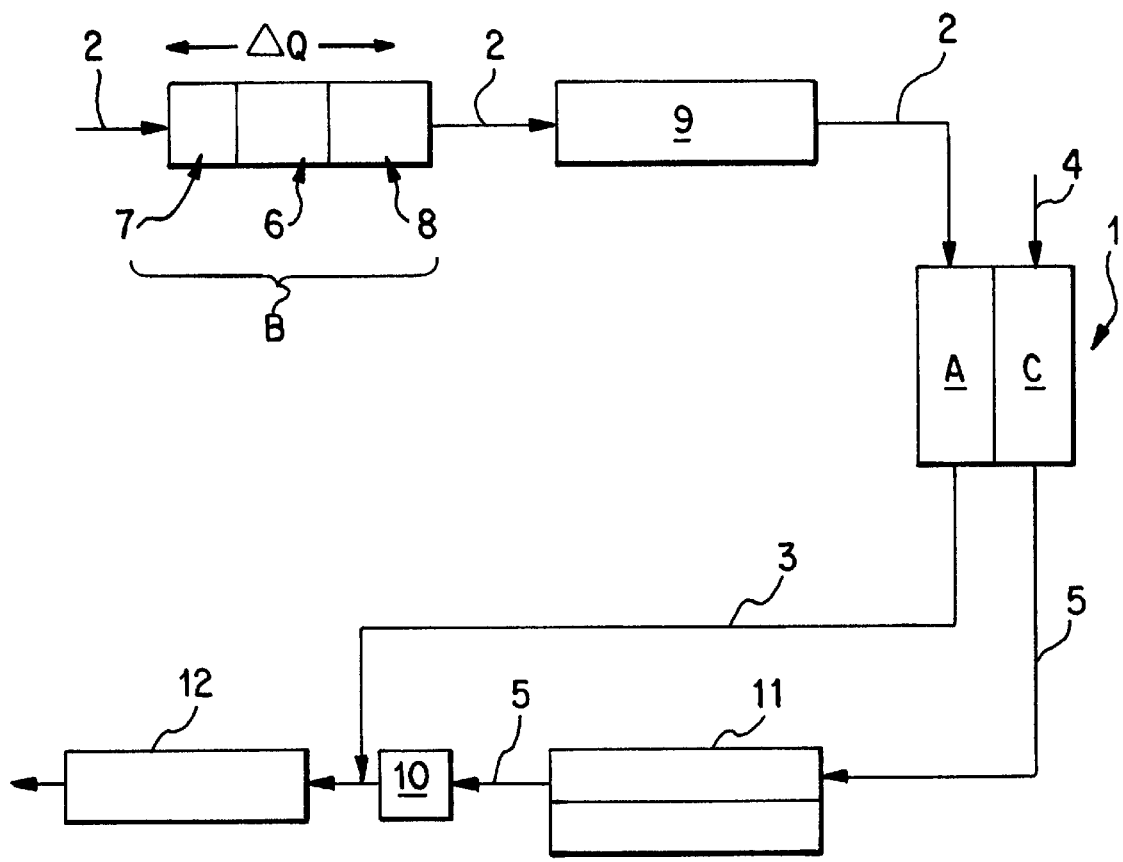
FIG. 1 depicts a preferred embodiment of a fuel cell system for carrying out-the process of the invention.

As shown in FIG. 1, the fuel cell system according to the invention includes a fuel cell 1, with an anode region A and a cathode region C. The anode region A has a supply input 2, while the cathode region C is supplied with a hydrogen-containing medium (or mixture of media) via an input 4. The at least partially reacted media are exhausted from the fuel cell 1 via an anode output 3 and a cathode output 5.

The fuel cell 1 can be a single cell or several fuel cells; (e.g., a fuel cell stack, which is provided by means of a series connection and/or parallel connection electric current. Such a stack can be sufficient, for example, for driving a motor vehicle, and is especially suitable for supplying consumers in such motor vehicles.

The anode input 2 has a component B, which includes an oxidizing unit 6, a reforming unit 8 and a first evaporator 7, which are structurally and thermally closely coupled.

The purpose of the oxidizing unit 6 is to oxidize a part of the hydrogen-containing medium (or mixture); the water that is generated as a result, and the waste heat generated by combustion of the medium (or mixture), are reformed in the reforming reaction of the reforming unit 8. The resulting hydrogen rich reformate steam is fed to the anode region A.

The first evaporator 7, which evaporates the hydrogen-containing medium (for example methanol), can be provided as an option in the component B, and is especially advantageous for a liquid hydrogen-containing medium or mixture.

Waste heat generated during oxidation in the oxidizing unit 6 is used to support the reforming reaction and preferably to evaporate the hydrogen-containing medium or mixture in the first evaporator 7. A quantity of heat $\Delta Q$ flows from the oxidizing unit 6 to the reforming unit 8 and/or to the evaporator 7.

The combustion in the oxidizing unit 6 produces water in proportion to the oxidation rate of the hydrogen-containing medium or mixture. This water is available for reforming in the reforming unit 8. At the same time, the water requirement for the water balance in the reforming reaction is coupled directly to the rate of oxidation.

At the same time the quantity of the hydrogen-containing medium or mixture that is burned to generate water can be varied as a function of the water requirement for the reforming process. This can be carried out in a number of ways.

The more waste heat that has to be dissipated or that is needed in a process, the more medium is burned in the oxidizing unit 6 and the more water is produced there. If more water is required, the rate of oxidation increases; if less water is required, the rate of oxidation decreases.

In the process according to the invention for operating the fuel cell system, the water requirement of the reforming reaction constitutes a reference input, to which the oxidation rate of the combustion is adjusted. The thermal balance of the component B is adjusted correspondingly.

In a preferred embodiment, the component B with evaporator 7, oxidizing unit 6 and reforming unit 8 is actively cooled. In particular, it is cooled with a medium, so that more hydrogen-containing medium or mixture of media has to be burned in the oxidizing unit 6 in order to generate sufficient waste heat to maintain the reforming reaction. An advantageous design provides to this end a separate water cooling of the component B.

The individual components—evaporator 7 and/or oxidizing unit 6 and/or reforming unit 8—can be actively cooled by themselves, or combinations of the components in the component B can be actively cooled. Since the waste heat of the oxiding unit 6 supports both the reforming reaction and the evaporation, the intensity of cooling defines the quantity of water generated during combustion.

The reforming unit 8 is expediently followed by a carbon monoxide removing unit 9 in order to clean the medium, which is rich in hydrogen after reforming, before it passes into the anode region. The carbon monoxide removing unit 9 is preferably not thermally coupled to the reforming unit 8. That is, the waste heat of the carbon monoxide removing unit 9 is not exhausted to the endothermic reforming reaction. Preferably the carbon monoxide removing unit 9 is water cooled.

Thus more water is produced in turn in the oxidizing unit 6, since the waste heat of combustion completely fuels the reforming reaction, than if a part of the thermal requirement were covered by the carbon monoxide removing unit 9.

A waste gas combustion unit 12 is provided on the outlet side of the anode region A, and a waste gas cooler 11 for cooling the cathode waste gas is arranged on the outlet side of the cathode region C. The waste gas cooler is followed by a water separator 10, preferably a condenser 10. Downstream of the condenser, the cathode waste gas and the anode waste gas flow into the waste gas combustion unit 12.

Oxygen feed, preferably air metering, into the oxidizing unit 6 and into any existing carbon monoxide removing units 9 takes place preferably by controlling the air feed, for example by controlling or regulating the speed of a blower. At the same time the temperature of the system is set preferably to a specified value and adjusted in operation to maintain this value. Oxygen is supplied preferably as a function of the temperature in the oxidation area of the oxidizing unit 6, in the reforming area of the reforming unit 8, in the carbon monoxide removing unit 9, at the outlet from the respective areas of the medium treated in the oxidizing unit 6 or the reforming unit 7, and/or in the carbon monoxide removing unit 9. It is expedient to conduct the oxygen feed, preferably air, with as little pressure loss as possible.

Preferably the division of the conveyed air over a pressure loss of appropriate feed lines and/or discharge lines of the reforming unit 9 and/or the oxidizing unit 6 (not shown), is set to a specified value. It is also advantageous to change the division of the conveyed air over mechanisms with low pressure loss, e.g. flaps, in the appropriate lines.

In a preferred low pressure fuel cell system with a maximum pressure of 2 bar in an oxygen feed system of the fuel cell system, the heat, required for a reforming reaction and/or evaporation, takes place upstream of the anode region A through partial combustion of the hydrogen-containing mediums into water.

It is especially advantageous to supply the oxidizing unit 6 and the carbon monoxide removing unit 9 with oxygen or air through a common conveying device, preferably a blower.

In the oxygen or air feed system of the fuel cell system according to the invention, the corresponding branches include distributors which exhibit low pressure loss and which bring about a pressure loss of a maximum of 100 mbar (preferably a maximum of 10 mbar). Such distributors may be, for example, sliders, flaps, and/or needle valves. The preferable temperature of the reforming reactor 7 is set to a predetermined value; and the temperature is adjusted to maintain this value.

The special advantage of such an arrangement lies in the fact that the otherwise expensive and complicated metering devices with high pressure losses for metering air or oxygen can be avoided. This feature is especially advantageous for a low pressure system, where high dynamic response is not necessarily required.

Another advantage is that only a part of the water from the cathode waste gas must be recovered to support the reforming reaction, since additional water is already produced in the anode input 2 and is available for this purpose. This quantity can be adjusted as a function of need by means of the quantity of the hydrogen-containing medium or the mixture of mediums burned in the oxidizing unit 6.

However, the temperature level for the condensation of water in the water separator 10 in the cathode output 5 can be simultaneously higher, so that the heat transfer buildup of the condenser can be less voluminous. Correspondingly, in the diaphragm process, a less efficient separation of the water from the cathode waste gas is also adequate to maintain the water balance of the system. Hence even in a fuel cell system with low system pressure in the gas generation system (preferably of a maximum of 2 bar), there is adequate water to operate the fuel cell system, which is extremely simplified and, therefore, inexpensive.

Figure 2:
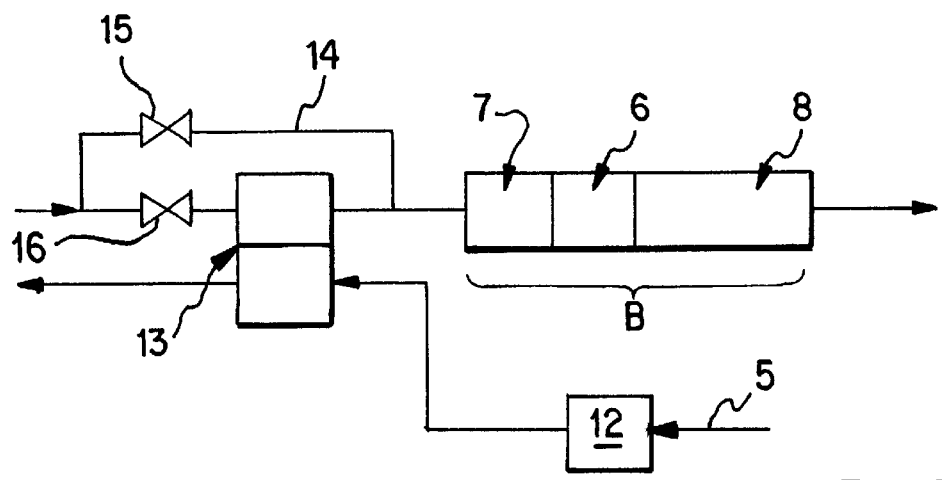
FIG. 2 depicts a preferred design on the waste gas side of the fuel cell system.

In another embodiment of the invention, heat from the combustion of the anode waste gas and the cathode waste gas in the waste gas combustion unit 12, can be used advantageously, as depicted in FIG. 2.

Downstream of the waste gas combustion unit 12 is a second evaporator 13, which is provided for the purpose of evaporating mediums in the anode input 2. The second evaporator 13 is arranged on the inflow side in front of the first evaporator 7 in the anode input 2. Preferably the second evaporator 13 is a hot gas evaporator.

A bypass line 14 is provided so that the media to be fed to the anode A can bypass the second evaporator and flow directly to the first evaporator 7. This feature is advantageous for critical water balance if more water has to be produced in the oxidizing unit 6.

The rate of oxidation increases in the oxidizing unit 6 because it must provide all of the heat required for evaporating the hydrogen-containing medium (or mixture). Correspondingly more water is generated through combustion; and the water balance is positively affected accordingly.

In a critical water balance state, the valve 16 (and thus access to the second evaporator 13) is closed to the hydrogen-containing medium or mixture, whereas the valve 15 is open and releases the way for the medium or the mixture of mediums into the bridging line 14 to the first evaporator 7.

The inventive process and the inventive configuration are especially suitable for fuel cell systems having low system pressure, and for such systems that do not have a high dynamic response requirement. Such systems can be designed very economically with the invention. Moreover, a decrease in the efficiency of the gas generation system can be set in order to provide the thermal and water balance of the fuel cell system (efficiency being defined as the ratio between the energy content of the hydrogen released in the fuel cell 1 and the energy content of the hydrogen-containing fuel fed into the system). The fuel cell system is thus especially simple and inexpensive.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a fuel cell system with a water balance, comprising:

reforming a hydrogen-containing medium in a reforming reactor by adding water to a hydrogen rich reformate;

feeding the reformate to an anode region of a fuel cell; and reacting the reformate in the fuel cell with oxygen from a cathode region of the fuel cell to form water;

wherein water that is required for at least one of the reforming reaction and water balance of the fuel cell system is provided at least in part by partial combustion of the hydrogen-containing medium in an oxidizing unit upstream of the reforming reactor; and wherein an oxidation rate of the partial combustion in the oxidizing unit is adjusted as a function of an amount of said water that is required.

2. The process according to claim 1, wherein thermal support for the reforming reaction is provided exclusively by the thermal energy generated during combustion.

3. The process according to claim 1, wherein, upon occurrence of an increase of water required for at least one of the reforming reaction and water balance in the fuel cell system, the oxidation rate of the combustion is increased.

4. The process according to claim 1, wherein, upon occurrence of an increase of water required for at least one of the reforming reaction and water balance in the fuel cell system, the oxidation rate of the combustion is decreased.

5. The process according to claim 4, wherein thermal energy from the waste gases of the fuel cell is provided for evaporating the hydrogen-containing medium in a second evaporator, whereby hydrogen-containing medium is fed at least in part in a gaseous state to the first evaporator.

6. The process according to claim 3, wherein, in the case of a requirement of the reforming reaction for additional water, the second evaporator is bypassed.

7. The process according to claim 1, wherein carbon monoxide is removed from the reformate in an exothermic reaction, which reaction is cooled independently of a thermal requirement of the reforming reaction.

8. The process according to claim 1, wherein thermal energy is removed from at least one of an oxidizing unit for performing said partial combustion and a reforming unit for reforming the hydrogen containing medium, to increase the rate of oxidation.

9. The process according to claim 8, wherein thermal energy is removed also via a first evaporator.

10. The process according to claim 1, wherein oxygen is fed into the oxidizing unit or into a carbon monoxide removing unit, as a function of a temperature in an area of combustion, an area of the reforming reaction, or an area of the carbon monoxide removal.

11. The process according to claim 1, wherein oxygen is fed into the oxidizing unit or into the carbon monoxide removing unit, as a function of an outlet temperature of the oxidizing unit, the reforming reaction or the carbon monoxide removing unit.

12. The process according to claim 1, wherein the reforming reactor is set to a specified temperature, which is maintained by controlling a quantity of oxygen supplied.

13. The process according to claim 1, wherein in a low pressure fuel cell system with maximum pressure of a maximum of 2 bar in an oxygen feed system of the fuel cell system, the heat required for at least one of reforming and evaporation, is generated upstream of the anode region, through partial combustion of the hydrogen-containing mediums into water.

14. Fuel cell apparatus, comprising:
a fuel cell system having at least one fuel cell, which contains an anode region with an anode input and an anode output and a cathode region with a cathode input and a cathode output; wherein
the anode input has a first component, which includes an oxidizing unit that is thermally coupled directly to the reforming unit, for partial oxidation of a hydrogen-containing medium, and a reforming unit for generating a hydrogen rich reformate from the hydrogen-containing medium;
the first component further comprises a first evaporator that is thermally coupled directly to the oxidizing unit, for evaporating the hydrogen-containing medium; and further comprising;
a second evaporator is coupled to be heated with waste-gases of the fuel cell, and is arranged in the anode input, on a gas inflow side upstream of the first component; and
a bypass line is arranged in the anode input, for bypassing the second evaporator, whereby hydrogen-containing medium can be fed directly to the first evaporator.

15. Apparatus according to claim 14, further comprising a carbon monoxide removing unit arranged between the component and the anode region, for removing carbon monoxide from the reformate.

16. Apparatus according to claim 15, wherein the carbon monoxide removing unit is coupled to be cooled independently of the reforming unit.

17. A fuel cell apparatus, comprising:
a fuel cell system having at least one fuel cell, which contains an anode region with an anode input and an anode output and a cathode region with a cathode input and a cathode output; wherein
the anode input has a first component, which includes an oxidizing unit for partial oxidation of a hydrogen-containing medium and a reforming unit for generating a hydrogen rich reformate from the hydrogen-containing medium;
the oxidizing unit is thermally coupled directly to the reforming unit; and
the medium pressure in the cathode output is at most 2 bar.

18. Apparatus according to claim 14, further comprising an air conveyor with regulatable or controllable speed, feeding oxygen into the fuel cell system.

19. A fuel cell apparatus, comprising:
a fuel cell system having at least one fuel cell, which contains an anode region with an anode input and an anode output and a cathode region with a cathode input and a cathode output; wherein
the anode input has a first component, which includes an oxidizing unit for partial oxidation of a hydrogen-containing medium and a reforming unit for generating a hydrogen rich reformate from the hydrogen-containing medium;
the oxidizing unit is thermally coupled directly to the reforming unit; and
the fuel cell apparatus further comprises a distributor with low pressure loss of at most 100 mbar, for supplying oxygen to the fuel cell system.

20. A method for regulating a water supply in a fuel cell system having a fuel cell unit, and a fuel supply unit that includes a reforming reactor connected to supply fuel to the fuel cell unit and an oxidizing reactor for supplying heat to support a reforming reaction in the reforming reactor and for supplying water to support a water requirement for operation of at least said reforming reactor, said method comprising:
controlling an oxidation rate of an oxidation reaction in said oxidizing reactor as a function of temperature in said reforming reactor to regulate said temperature to a desired value;
cooling said fuel supply unit; and
controlling an amount of water generated in said oxidation reactor, by means of intensity of said cooling.

21. The method according to claim 20, wherein said desired temperature is a constant value.

22. A method for regulating a supply of water in a fuel cell system having a fuel cell unit, and a fuel supply unit that includes a reforming reactor connected to supply fuel to the fuel cell unit and an oxidizing reactor for supplying heat to support a reforming reaction in the reforming reactor and for supplying water to support a water requirement for operation of at least said reforming reactor, said method comprising:
controlling an oxidation rate of an oxidation reaction in said oxidizing reactor as a function amount of said water requirement;
wherein said controlling of said oxidation reaction comprises,
cooling said fuel supply unit; and
controlling an amount of water generated in said oxidizing reaction by varying intensity of said cooling and adjusting said oxidation rate to maintain a desired temperature in said reforming reactor.

23. The method according to claim 22, wherein said adjusting of said oxidation rate comprises controlling a rate for supplying an oxygen containing gas to said oxidizing reactor.

24. The method according to claim 22, wherein:
said fuel supply unit further comprises an evaporator unit disposed in a fuel flow path upstream of said oxidizing reactor; and
said evaporator unit is bypassed when said water requirement increases.

25. The method according to claim 22, wherein said cooling comprises active cooling of the fuel supply unit via a cooling medium.

26. A method for regulating a water supply in a fuel cell system having a fuel cell unit, and a fuel supply unit that includes a reforming reactor connected to supply fuel to the fuel cell unit and an oxidizing reactor for supplying heat to support a reforming reaction in the reforming reactor and for supplying water to support a water requirement for operation of at least said reforming reactor, said method comprising:
controlling temperature in said reformer by i) adjusting oxidation rate in the oxidizing reactor and ii) active cooling;
adjusting a balance between said oxidation rate and said cooling as a function of said water requirement.

* * * * *